3,715,303
HYDROTREATMENT OF FOSSIL FUELS
Arnold N. Wennerberg, Chicago, and Alvin W. Frazier, Chicago Heights, Ill., assignors to Standard Oil Company, Chicago, Ill.
Filed May 18, 1971, Ser. No. 144,472
Int. Cl. C10g 13/06, 37/06; B01j 11/06
U.S. Cl. 208—112                    12 Claims

ABSTRACT OF THE DISCLOSURE

A fossil fuel including polynuclear aromatics is hydrotreated at elevated temperatures and pressures and in the presence of hydrogen by contacting said fuel with a catalyst comprising activated carbon and an alkali metal component or an alkaline earth metal component or both.

BACKGROUND

Figure 1:
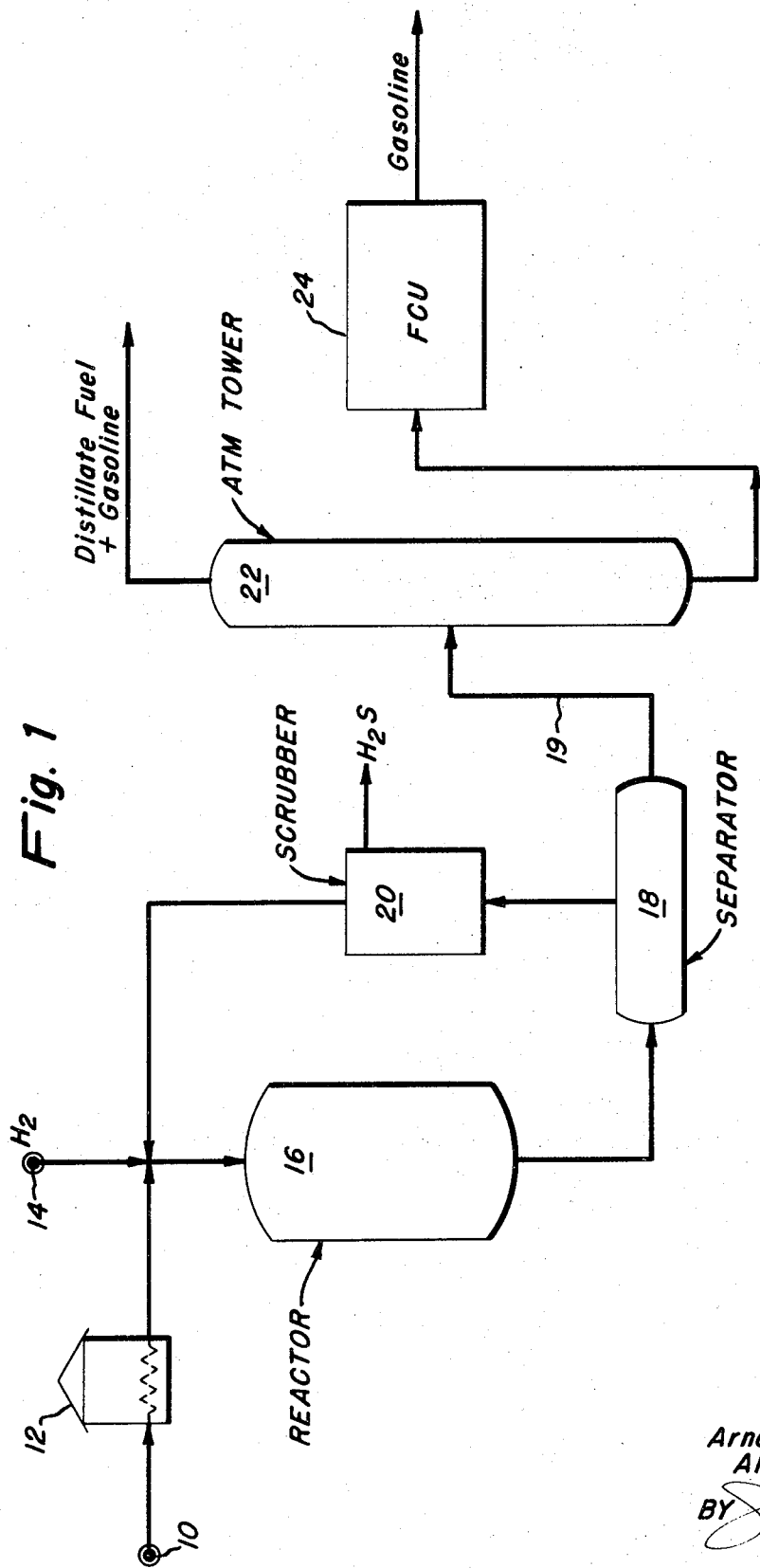

Fossil fuels such as resid hydrocarbons containing asphaltenes (polynuclear aromatics) and traces of metals such as vanadium and nickel are commonly treated with hydrogen in the presence of a desulfurization catalyst. The asphaltenes have only limited solubility in the resid composite and interfere with conventional processing techniques. For example, frequently their presence results in the formation and separation of coke or insoluble asphaltenes which plug the fixed bed of catalyst, especially at high conversion severities. Because the conversion severity is limited by the presence of asphaltenes, the vanadium and nickel in turn cannot be completely removed by conventional processing techniques. Moreover, the product produced by conventional processes is usually a black material boiling around 650° F. or higher and in most instances, because of its metals and carbon residue content, it is undesirable as a feed to catalytic cracking units, either fixed bed units or fluidized cracking units (FCU).

We have discovered a process for substantially upgrading the quality of fossil fuels containing polynuclear aromatics for such uses as low sulfur fuel, FCU feed, etc. According to our process, polynuclear aromatics, either in fossil fuels or otherwise, are contacted, preferably as an intimate mixture of catalyst and feed, at elevated temperatures and pressures and in the presence of hydrogen with a catalyst comprising activated carbon and an alkali metal component or an alkali earth metal component or both. The amount of metal component is sufficient to promote cracking of polynuclear aromatics. In some instances it may also be desirable to include metallic components from Groups VI and VIII of the Periodic Table such as, for example, nickel, tungsten, cobalt, molybdenum, iron, or their oxides or their sulfides.

Polynuclear aromatics having a number average molecular weight of about 400 or greater can most advantageously be treated according to our process. Fossil fuels such as tar sands, shale oils, coals, or hydrocarbons such as resids contain such heavy polynuclear aromatics. Advantageously, the coal is dispersed in a carrier such as recycle oil or a coal extract is dissolved in a suitable solvent such as Tetralin. The solid fuels are high in polynuclear aromatics, especially the coal which can contain as high as 50–80 wt. percent polynuclear aromatics. The liquid fuels, especially resids, include polynuclear aromatics called asphaltenes and resins. The asphaltene concentration in, for example, a vacuum resid ranges between about 0.1 and about 30.0 wt. percent depending on its crude oil source, and the resin concentration ranges between about 25 and about 70 wt. percent.

The resins are low molecular weight materials that are heptane soluble and are absorbed on the surface of silica gel when a heptane solution of resins and oils is passed over a column of the silica gel. The asphaltenes have high molecular weights such as, for example, from about 1,000 to about 15,000 and are insoluble in hot heptane. The structure of asphaltenes can be schematically illustrated as follows. (Actual structures can be very complex and can include sulfur, nitrogen and various metals.)

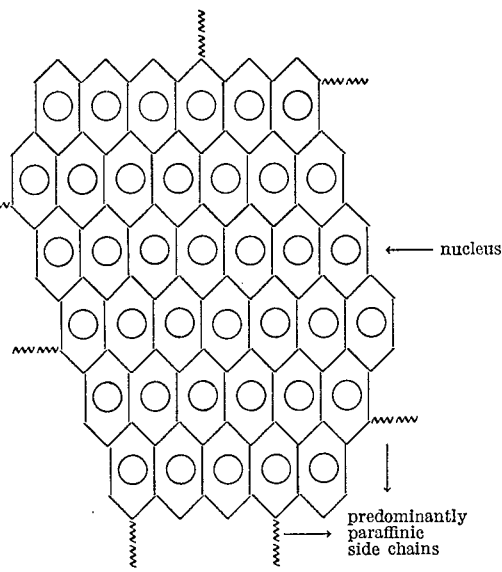

The catalyst which we use appears to have the ability to split the nucleus (central polynuclear array) of the asphaltene molecule. The evidence which we rely upon in drawing this conclusion is the character of the product of our process. A typical feed which we would treat according to our process would be a resid including from about 0.1 to about 25 wt. percent asphaltenes based on the weight of the resid. According to our process this feed can be converted into a light, amber-colored, free-flowing oil which contains very low concentration of metals and asphaltenes. In contrast, when the same feed is hydrotreated using a conventional acidic catalyst comprising alumina impregnated with cobalt and/or molybdenum, the feed is converted to a product having a black color. This indicates that many of the asphaltenes nuclei, though modified, remain essentially intact. We believe the presence of the alkali or alkaline metal component, which renders our carbon catalyst basic, is critical in obtaining the improved hydrocarbon product of our process.

It appears as if our catalyst is somewhat selective. Present data indicate that the polynuclear aromatics, when treated according to our process, are converted to lower molecular weight aromatics including substituent alkyl groups. It is desirable to maintain a high concentration of resins in the reaction mixture, since resins help maintain the asphaltenes in solution. Thus the asphaltenes will not precipitate and clog the reactor. Present data indicate that our process reduces the molecular weight of asphaltenes by a factor of about 10, and the molecular weight of resins by a factor of about 3. Consequently, resin concentration in the reaction mixture of our process is always relatively high, minimizing loss of asphaltene solubility. The tendency toward reactor plugging is thus greatly reduced. And, surprisingly, our catalyst cracks or otherwise modifies the metal-containing compounds in the resid, and the metals are deposited on our catalyst without any noticeable adverse effects during the time of our experiments. High molecular weight sulfur-containing compounds are also cracked in our process. Our catalyst, however, appears to have little effect on low molecular weight sulfur compounds commonly found in resids such as benzthiophene and dibenzthiophene. Hence, there can be virtually complete demetalization and partial desulfurization of the resid using our catalyst.

Specifically, the catalyst comprises activated carbon having a surface area in the range of from about 200 to about 2,500 square meters per gram of carbon. This catalyst can be in either powder or granular form. In the granular form the preferred surface area ranges from about 800 to about 2,000 square meters per gram of carbon. This activated carbon is impregnated with the metal component which is preferably in the form of a hydroxide, sulfide or oxide. Preferred alkali metals are potassium, sodium, lithium, rubidium and cesium. Preferred alkaline earth metals are magnesium, calcium, strontium and barium. The concentration of metal typically varies from about 0.1 to about 50 wt. percent based on the weight of carbon.

In preparing the catalyst, a metal salt can be used as a starting ingredient. It is dissolved in water and then the aqueous solution can be mixed with the activated carbon. The water is then removed to deposit the salt on the carbon. Also, decomposable salt forms such as acetates or formates can be used as starting ingredients. These can be mixed with the carbon and heated so that the salts will decompose and the metals be deposited on the carbon surface. We have found the most preferred method of preparation to be dissolving a metal hydroxide in an alcoholic solution such as methanol, ethanol or propanol, mixing carbon with the solution, and then removing the alcohol. The most preferred metal hydroxide is potassium hydroxide.

The preferred conditions for treating a resid according to our process are as follows: a temperature from about 650° to about 950° F., a pressure from about 500 to about 4,000 p.s.i.g., a feed rate from about 0.1 to about 10 volumes of resid per volume of catalyst per hour, and from about 4,000 to about 20,000 standard cubic feet of hydrogen per barrel of feed. The most preferred process conditions are: a temperature from about 780° to about 830° F., a pressure from about 1,000 to about 2,500 p.s.i.g., a feed rate from about 0.3 to about 2.0 volumes of resid per volume of catalyst per hour, and from about 4,000 to about 10,000 standard cubic feet of hydrogen per barrel of feed. The most preferred catalyst in treating resids is a granular activated carbon impregnated with an alkali hydroxide such as potassium hydroxide.

The product of our process may be fed to a fluidized catalytic cracking unit. Preferably, this product may be first fractionated under either atmospheric or vacuum conditions depending upon the asphaltene content in the product. However, the product of our process will normally contain some organic sulfur compounds in varying amounts, depending upon the source of the resid. Consequently, it may be desirable first to desulfurize this product using conventional desulfurization technology before forwarding to the fluidized catalytic cracking unit.

Although we prefer to control our process conditions so that the product of our process can be fed to a fluidized cracking unit, it may be desirable to operate our process in a way that promotes more thermal cracking. This is achieved by operating at relatively high temperatures in the range from about 800° to about 900° F. Thermal cracking appears to occur along the predominantly paraffinic side-chains of the polynuclear aromatic molecule and accompanies the hydrogenation of the aromatic polynuclear components.

EXAMPLE OF CATALYST PREPARATION

To prepare a catalyst which includes 30 wt. percent potassium hydroxide based on the weight of carbon, first prepare at 70° F. 100 grams of a methanol solution including 20 grams of potassium hydroxide dissolved in 80 grams of methanol. Seventy grams of activated carbon is then mixed with this solution and the methanol is evaporated. A preferred carbon is manufactured by Pittsburgh Carbon and Chemical Company, designated as SGL active granular carbon, mesh size 10–20, and having a surface area of about 800 square meters.

PREFERRED EMBODIMENTS

FIG. 1 is a flow diagram schematically illustrating the hydrotreating process of our invention. Resid from source 10 passes through heater 12 and is then mixed with hydrogen from source 14. The mixture of resid and hydrogen then percolates down through a bed of alkalized carbon catalyst in reactor 16. In reactor 16 the resid is cracked into lower molecular weight hydrocarbons, and metals in the resid are deposited on the catalyst. Some desulfurization also occurs to produce hydrogen sulfide. The effluent from reactor 16 flows into separator 18 where unused hydrogen, gaseous hydrocarbons and hydrogen sulfide are removed. The hydrogen mixture is recycled to reactor 16 via scrubber 20 which removes the hydrogen sulfide, and the liquid effluent from separator 18 flows via line 19 into an atmospheric fractionating tower 22. Distillate fuel and gasoline are removed from the top of tower 22 and 650+° F. boiling materials are withdrawn from the bottom of tower 22. Since these 650+° F. materials are of such a high grade quality, containing virtually no asphaltenes or metals, they can be fed directly to fluidized catalytic cracking unit 24.

For this first embodiment of our process, the following Table I sets forth in detail the composition of the catalyst, the resid feed and the effluent from reactor 16, and the conditions in reactor 16.

TABLE I

|  | Reactor 16 |
| --- | --- |
| Operating conditions: | |
| Pressure, p.s.i | 3,500 |
| Temperature, ° F | 805 |
| Volumes of feed/hr. per volumes of catalyst | 0.34 |

| Process stream properties: | Feed, West Texas 650+° F. resid | Product of Reactor 16, $C_6$+ liquid recovery, 95 wt. percent of total product |
| --- | --- | --- |
| Gravity, ° API | 15.7 | 23.9 |
| Sulfur, wt. percent | 3.3 | 1.40 |
| Hot heptane insolubles, wt. percent | 2.4 | 0.03 |
| Metals content, p.p.m.: | | |
| Nickel | 14 | 0.4 |
| Vanadium | 23 | 0.1 |
| Carbon residue, wt. percent | 8.3 | 1.9 |

NOTE.—Catalyst composition—10% KOH 10–20 mesh SGL carbon.

The data in Table I show that the product has a low metals content and a low asphaltene (heptane insolubles) level. The carbon residue is only slightly higher than that for a typical FCU feed. The process has removed about 60% of the sulfur. Cracking evaluation of the 650+° F. fraction indicate this product has catalytic cracking quality properties similar to a high-sulfur virgin gas oil.

Figure 2:
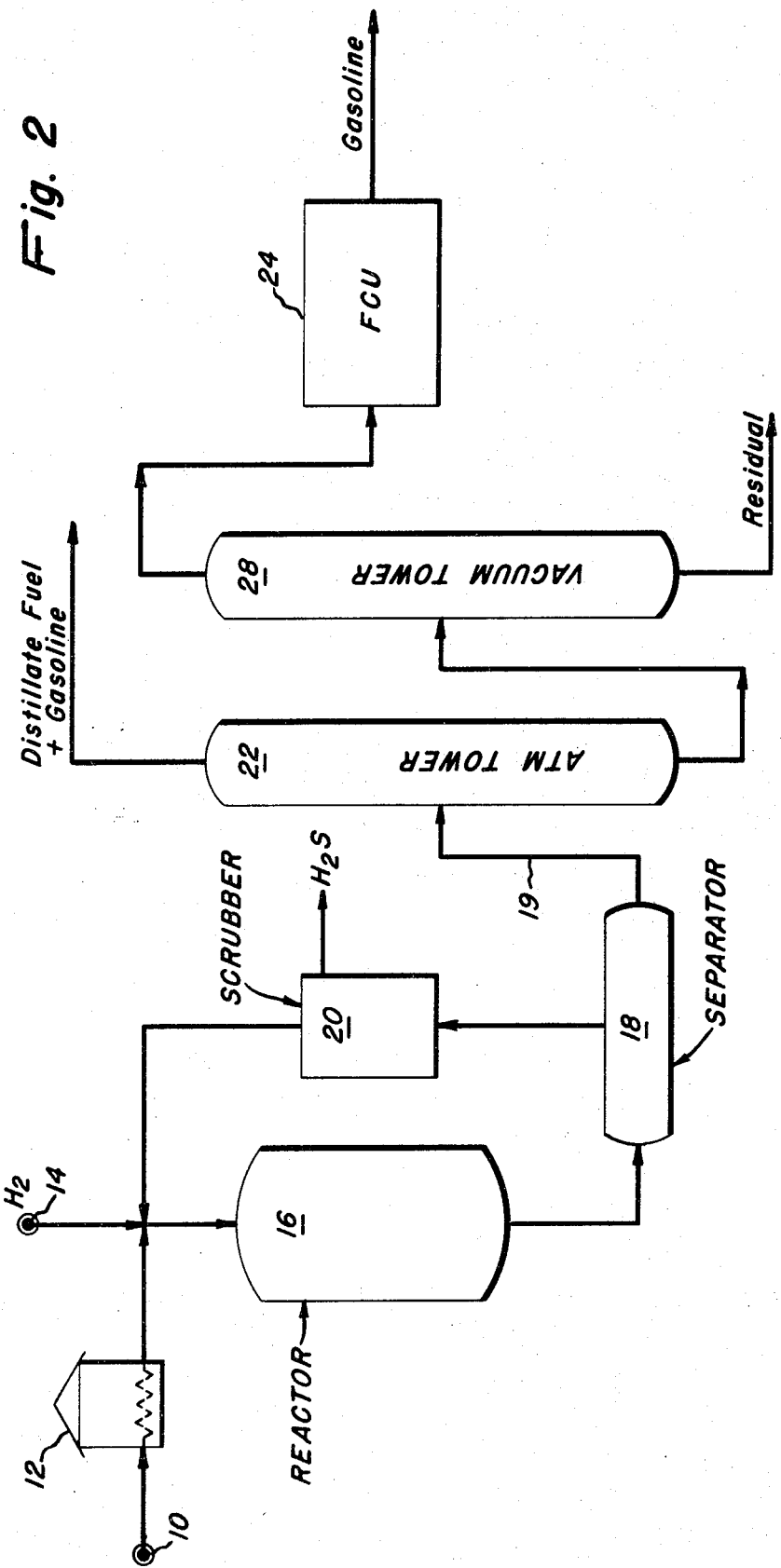

FIG. 2 is a flow diagram schematically illustrating a second embodiment of our process. This second embodiment is similar to the process shown in FIG. 1, and like process equipment is designated by the same numerals. In this second embodiment conditions differ such that the effluent from the bottom of atmospheric fractionating tower 22 includes some asphaltenes which are separated from other hydrocarbons through the means of a vacuum fractionating tower 28. Residual material is withdrawn from the bottom of tower 28 and 650+° F. boiling materials are withdrawn from the top of tower 28 and fed to fluidized catalytic cracking unit 24.

Figure 3:
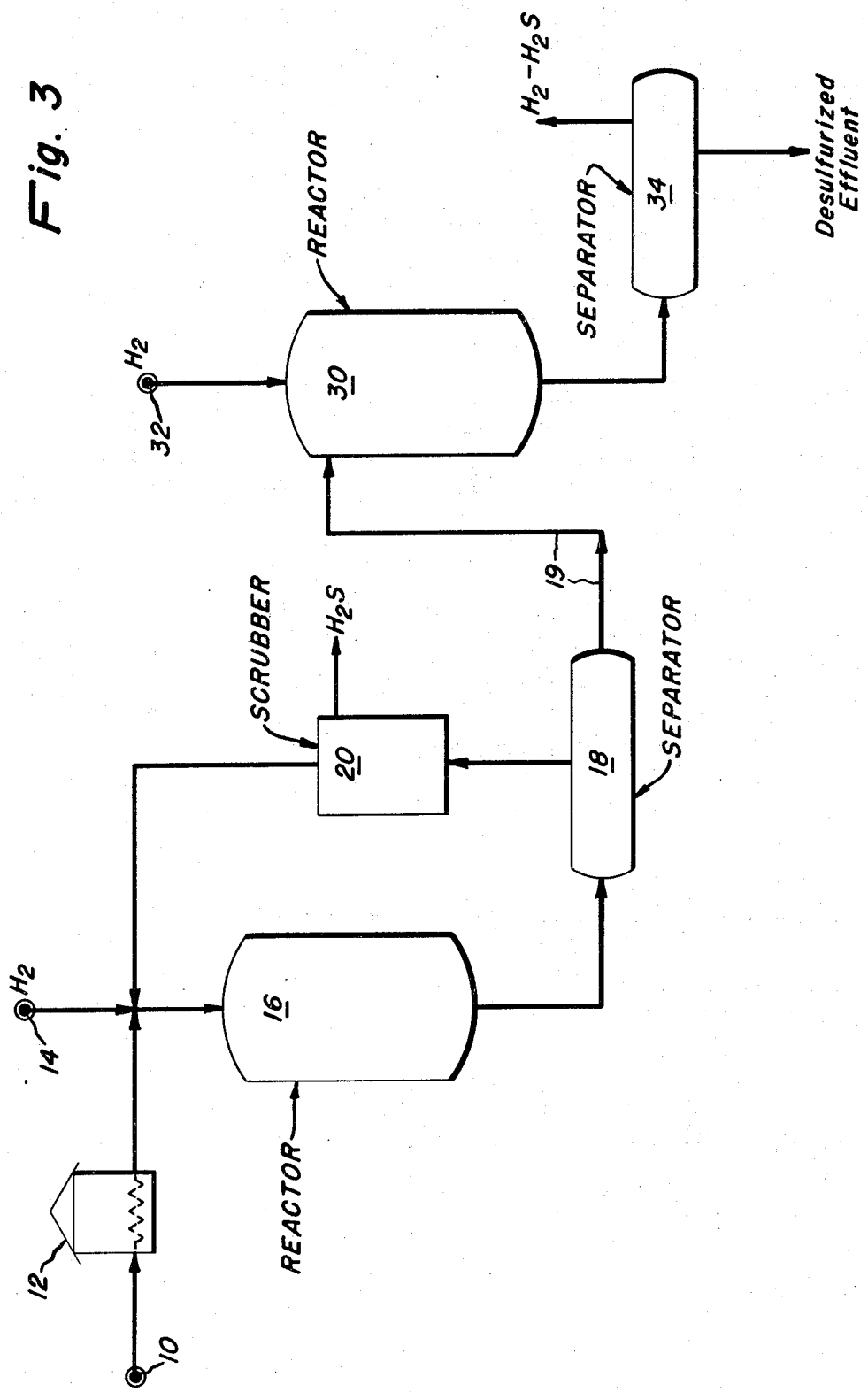

FIG. 3 is a flow diagram schematically illustrating a third embodiment of our process. This third embodiment is similar to the processes shown in FIGS. 1 and 2, and like process equipment is designated by the same numerals. In this third embodiment the effluent from separator 18, which includes some organic sulfur compounds, passes through a second reactor 30. Reactor 30 contains a bed of desulfurization catalyst such as an alumina impregnated with metals from Groups VI and VIII of the Periodic Table. Hydrogen from source 32 is injected into the top of reactor 30 and mixes with the effluent from separator 18 as this effluent percolates down through the catalyst bed. Temperatures and pressures in reactor 30 are at elevated conditions causing the organic sulfur compounds in the effluent to react and product hydrogen sulfide gas. Effluent from reactor 30 flows into separator 34 which removes unused hydrogen and hydrogen sulfide. The separator effluent is a desulfurized hydrocarbon containing less than 0.5 wt. percent sulfur. This desulfurized effluent can then be fractionated and used as a feed to a fluidized catalytic cracking unit or as a low sulfur fuel.

For this third embodiment of our process, the following Table II sets forth in detail the composition of the catalysts, the resid feed, effluent from separator 18 and effluent from reactor 30, and the conditions within reactor 16 and reactor 30.

TABLE II

|  | Reactor 16 | Reactor 30 |
|---|---|---|
| Operating conditions: |  |  |
| Pressure, p.s.i.g. | 3,500 | 800 |
| Temperature, °F. | 820 | 675 |
| Space velocity (vol. product/vol. catalyst/hr.) | 0.45 | 2.0 |

|  | Feed | Product of Reactor 16 | Product of Reactor 30 |
|---|---|---|---|
| Process stream properties: |  |  |  |
| Gravity, °API | 15.7 | 24 | 27 |
| Sulfur, wt. percent | 3.34 | 1.53 | 0.36 |
| Hot heptane insolubles, wt. percent | 2.45 | 0.04 | (¹) |

¹ No data.

NOTE.—Catalyst composition:
Reactor 16: 30 wt. percent KOH on SGL granular carbon.
Reactor 30: 3% cobalt oxide, 15% molybdenum oxide, 82% aluminum oxide.

The data in Table II show that the product from an alkalized carbon treatment can be readily desulfurized to 0.5 wt. percent sulfur or lower. The low asphaltene levels in the product from the first stage permit extensive desulfurization in a second stage, with relatively lower risk of reactor plugging from asphaltene deposition in the catalyst bed.

Figure 4:
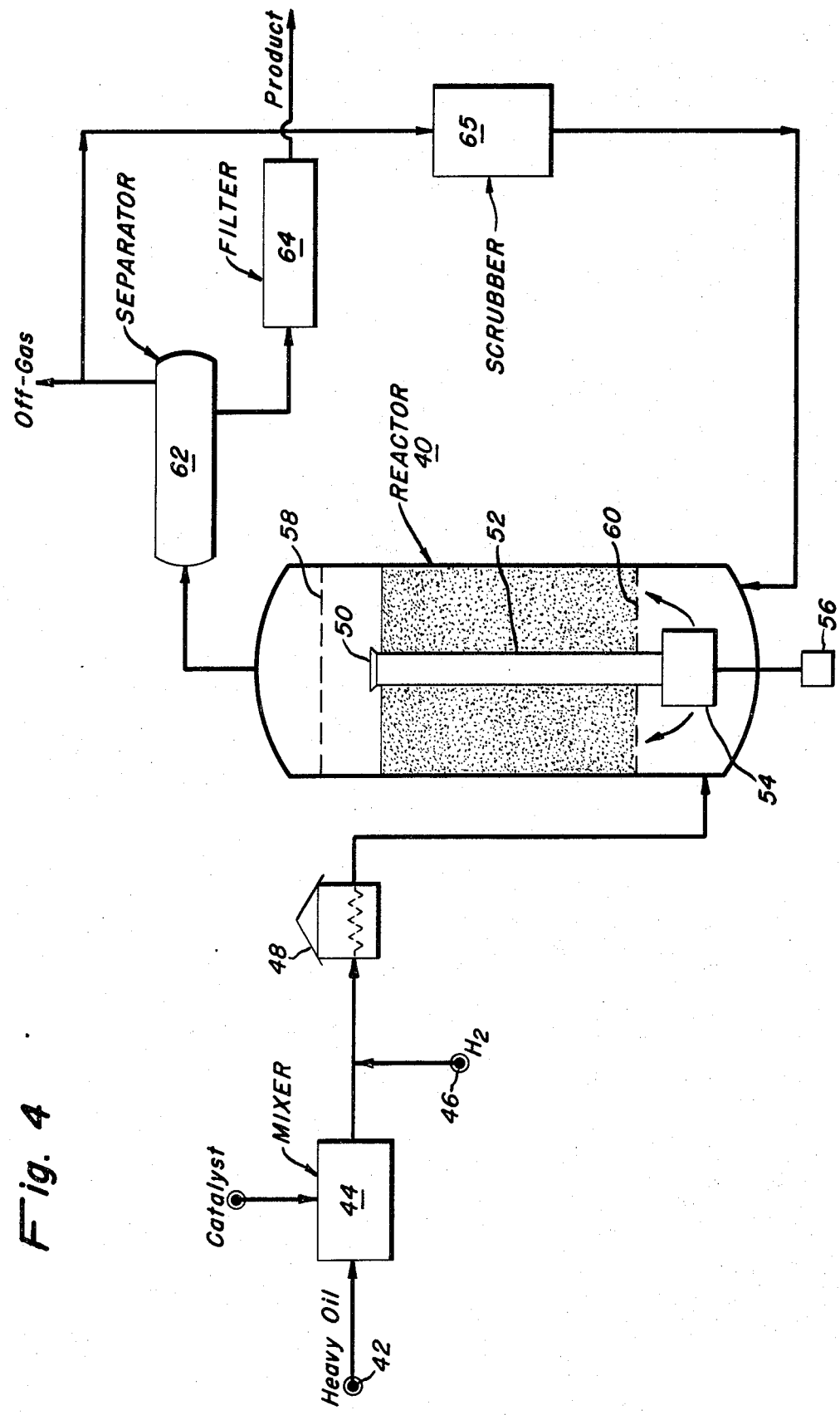

FIG. 4 is a flow diagram schematically illustrating a fourth embodiment of our process utilizing an ebullating reactor 40. Although the ebullating bed reactor is preferred, other suspension flow systems can also be used. In this embodiment a heavy oil feed including polynuclear aromatics from source 42 is fed to mixer 44 and mixed with an alkalized carbon catalyst, as previously described. Preferably, the carbon used is in a finely divided form having a particle size ranging between about 300 microns and about 3/16 inch. Since the effective density of the activated carbon catalyst can be controlled over a wider range than previous catalytic materials, a lightweight catalyst can be provided which is maintained in suspension with less agitation then heretofore. This carbon, impregnated with an alkali metal component or an alkaline earth metal component, is mixed thoroughly with the heavy oil, and then hydrogen from source 46 is injected into the mix. The oil-catalyst-hydrogen mix then flows through heater 48 and into the bottom of reactor 40. This mix of solid, liquid and gas flows upwardly through reactor 40 with the catalyst particles being suspended in the oil. Oil and catalyst at the top of the reactor flow into the open upper end 50 of standpipe 52 and are recirculated via pump 54 which is turned by motor 56. Screen 58 at the top of reactor 40 and screen 60 at the bottom of reactor 40 help confine the particles of catalyst within reactor 40. The temperature within reactor 40 ranges between about 650° F. and about 950° F., pressure ranges between about 500 and about 4,000 p.s.i.g., feed rate ranges between about 0.1 and about 10 volumes of oil per volume of catalyst per hour, and the hydrogen throughput ranges between about 4,000 and about 20,000 standard cubic feet of hydrogen per barrel of feed. The feed is cracked into lower molecular weight hydrocarbons. These cracked products form vapor and liquid phase at the top of reactor 40 and are withdrawn and fed into separator 62 which separates the gases from the liquid hydrocarbons. These liquid hydrocarbons flow into filter 64 which removes any catalyst carried with the product from reactor 40, and some gas is recycled via scrubber 65 to the bottom of reactor 40.

We claim:

1. A process for hydrotreating polynuclear aromatics including the step of contacting said polynuclear aromatics at elevated temperatures and pressures and in the presence of hydrogen with a catalyst comprising activated carbon and an alkali metal component or an alkaline earth metal component or both, said metal component being present in an amount sufficient to promote cracking of the polynuclear aromatics.

2. The process of claim 1 wherein the polynuclear aromatics are part of a fossil fuel.

3. The process of claim 2 wherein said fossil fuel is a tar sand, shale oil, coal or resid.

4. The process of claim 1 wherein the alkali metal component or alkaline earth metal component is in the form of a hydroxide, sulfide or oxide.

5. The process of claim 1 wherein polynuclear aromatics are present in a resid hydrocarbon being hydrotreated and the catalyst comprises activated carbon having a surface area in the range of from about 200 to about 2,500 square meters per gram of carbon and about 0.1 to about 50 wt. percent of an alkali metal component or an alkaline earth metal component or both, based on the weight of the carbon.

6. The process of claim 5 wherein the catalyst additionally includes a metallic component from Group VI or Group VIII of the Periodic Table.

7. The process of claim 1 wherein contacting is conducted at a temperature range of from about 800° to about 900° F. to promote thermal cracking.

8. In a process for hydrotreating hydrocarbons including from about 0.1 to about 30.0 wt. percent asphaltenes based on the weight of the hydrocarbon, the step of contacting said hydrocarbon at a temperature of from about 650° to about 950° F., a pressure of from about 500 to about 4,000 p.s.i.g., a feed rate of from about 0.1 to about 10 volumes of resid per volume of catalyst per hour, and in the presence of from about 4,000 to about 20,000 standard cubic feet of hydrogen per barrel of feed, and a catalyst comprising an activated carbon having a surface area in the range of from about 200 to about 2,500 square meters per gram of carbon and from about 0.1 to about 50 wt. percent of alkali metal component or an alkaline earth metal component or both, based on the weight of the carbon.

9. The process of claim 8 wherein the alkali metal is potassium.

10. The process of claim 9 wherein the alkali metal is in the hydroxide form.

11. A process for treating a hydrocarbon feed including asphaltenes, comprising the steps of
(a) contacting said feed at elevated temperatures and pressures and in the presence of hydrogen with a catalyst comprising activated carbon and an alkali metal component or an alkaline earth metal component or both, whereby a product is formed which is suitable for a feed to a fluidized cracking unit, and
(b) feeding the product of step (a) to a fluidized cracking unit.

12. A process for treating a hydrocarbon feed including asphaltenes and organic sulfur compounds, comprising the steps of
(a) contacting said feed at elevated temperatures and pressures and in the presence of hydrogen with a catalyst comprising activated carbon and an alkali metal component or an alkaline earth metal component or both, whereby the product is formed which includes organic sulfur compound, and
(b) contacting the product of step (a) at elevated temperatures and pressures and in the presence of hydrogen with a catalytic amount of a catalyst adapted to crack the organic sulfur compounds.

References Cited

UNITED STATES PATENTS

| | | | |
|---|---|---|---|
| 2,379,654 | 7/1945 | Royer | 208—230 |
| 2,481,300 | 9/1949 | Engel | 208—262 |
| 2,577,824 | 12/1951 | Stine | 208—230 |
| 2,801,208 | 7/1957 | Horne et al. | 208—61 |
| 2,877,176 | 3/1959 | Wolff et al. | 208—208 |
| 2,991,242 | 7/1961 | Branton et al. | 208—134 |
| 3,546,103 | 12/1970 | Hamner et al. | 208—211 |
| 1,922,542 | 8/1933 | Krauch et al. | 208—10 |
| 1,938,542 | 12/1933 | Pier et al. | 208—10 |

FOREIGN PATENTS

| | | |
|---|---|---|
| 27,339 | 1970 | Japan. |

PAUL M. COUGHLAN, JR., Primary Examiner

G. E. SCHMITKONS, Assistant Examiner

U.S. Cl. X.R.

208—10, 11, 59, 61, 216; 252—447, 468